United States Patent [19]
Ueda

[11] Patent Number: 5,436,888
[45] Date of Patent: Jul. 25, 1995

[54] COMMUNICATION PATH CONTROL METHOD AND COMMUNICATION DEVICE

[75] Inventor: Takuji Ueda, Kawasaki, Japan

[73] Assignee: Fujitsu Limited, Kanagawa, Japan

[21] Appl. No.: 171,171

[22] Filed: Dec. 22, 1993

[30] Foreign Application Priority Data

Dec. 25, 1992 [JP] Japan ................... 4-345003

[51] Int. Cl.⁶ .......................................... H04Q 11/00
[52] U.S. Cl. ...................... 370/54; 370/85.6; 370/85.9; 340/825.5
[58] Field of Search ............ 370/58.1, 58.2, 58.3, 370/60, 94.1, 13, 95.1, 85.7, 16, 54, 110.1, 85.9; 340/825.5, 825.51, 825.01, 827; 455/58.1

[56] References Cited

U.S. PATENT DOCUMENTS

| 5,198,808 | 3/1993 | Kudo | 370/16 |
| 5,276,686 | 1/1994 | Ito | 370/95.1 |

FOREIGN PATENT DOCUMENTS

| 64-55926 | 8/1987 | Japan . |
| 64-55931 | 8/1987 | Japan . |
| 64-22446 | 2/1989 | Japan . |
| 64-288635 | 4/1989 | Japan . |

Primary Examiner—Douglas W. Olms
Assistant Examiner—Ajit Patel

Attorney, Agent, or Firm—Armstrong, Westerman, Hattori, McLeland & Naughton

[57] ABSTRACT

In a method for controlling communication paths multiplexed in a communication medium connecting first and second communication devices, each of which devices can simultaneously perform a plurality of works. It is determined whether a communication request from one of the works is a normal communication request or an emergency communication request. It is determined whether or not the number of communication paths which are now in use is less than a first predetermined number when it is determined that the communication request is a normal communication request. An idle communication path is allotted to the communication request when it is determined that the number of communication paths in use is less than the first predetermined number. It is determined whether or not the number of communication paths which are now in use is less than a second predetermined number greater than the first predetermined number and equal to a maximum number of communication paths available in the communication medium. An idle communication path is allotted to the communication request which is determined to be as an emergency communication request when it is determined that the number of communication paths in use is less than the second predetermined number.

10 Claims, 8 Drawing Sheets

COMMUNICATION PATH CONTROL METHOD AND COMMUNICATION DEVICE

BACKGROUND OF THE INVENTION

1. Field of the Invention

The present invention generally relates to a method of controlling communications paths, and more particularly to a method for acquiring one or a plurality of communications paths from among a predetermined number of communications paths. Further, the present invention is concerned with a communication device carrying out the above method.

2. Description of the Prior Art

A computer system is known in which a plurality of computers, such as large-scale, general purpose computers, are connected together. These computers share execution of works or application programs.

Figure 1:
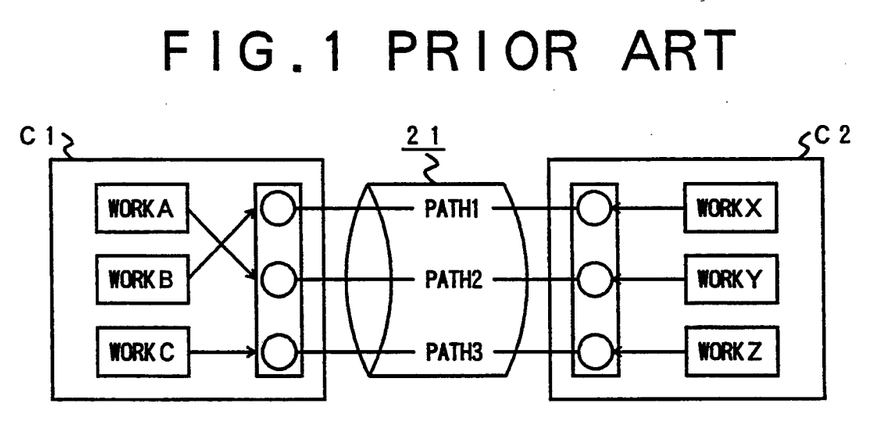
FIG. 1 is a block diagram of a conventional system having two computers.

FIG. 1 shows such a decentralized computer system having two computers #1 and #2, which are connected to each other via a communication medium 21. As shown in FIG. 1, the communication medium 21 has three communications paths 1, 2 and 3, which are multiplexed in a conventional multiplexing method. In the case shown in FIG. 1, computer #1 executes works A, B and C, and computer #2 executes works X, Y and Z. The works executed by computers #1 and #2 share the communication paths 1, 2 and 3 and communicate with each other, so that computers #1 and #2 proceed with execution of the works. More specifically, the works A, B and C executed by computer #1 use the communication paths 2, 1 and 3, respectively, and communicate with the shared works Y, X and Z. For example, computer #1 manages a group of the three communication paths 1, 2 and 3 provided by the communication medium 21.

A limited number of communication paths is available in one communication medium 21 in terms of the characteristic of the communication medium 21 and the performance of the CPU and memories.

Figure 2A:
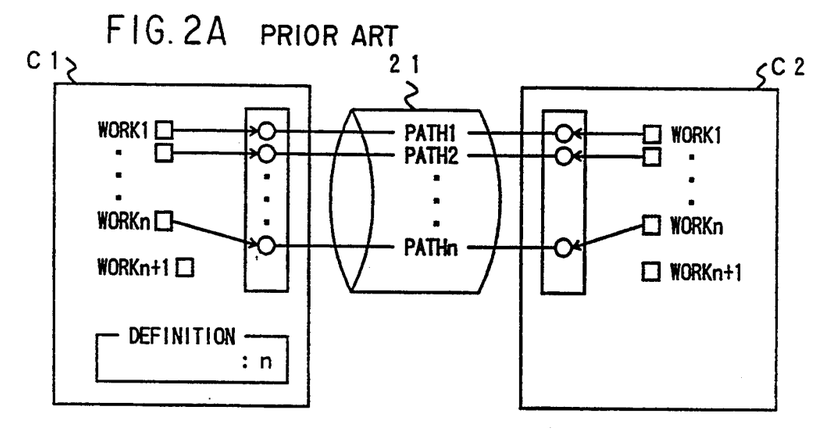
FIGS. 2A, 2B and 2C are diagrams how communications paths are allotted to works executed by the computers shown in FIG. 1.
Figure 2B:
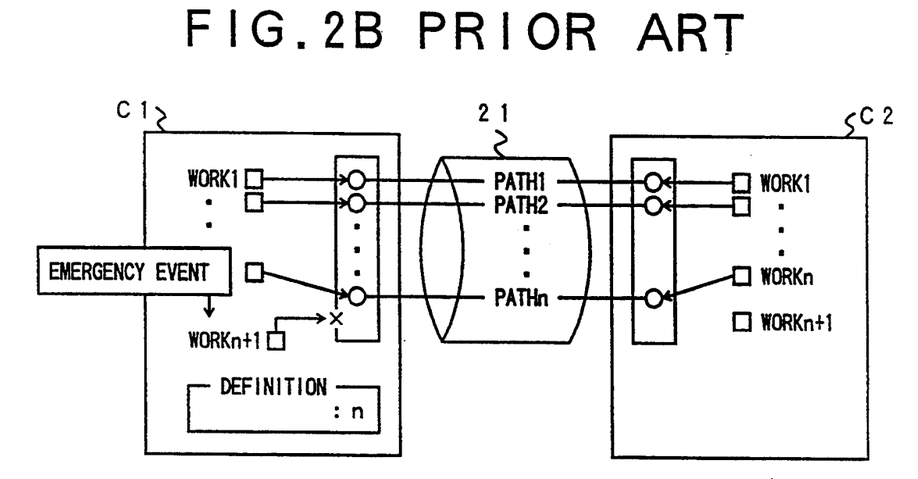
Figure 2C:
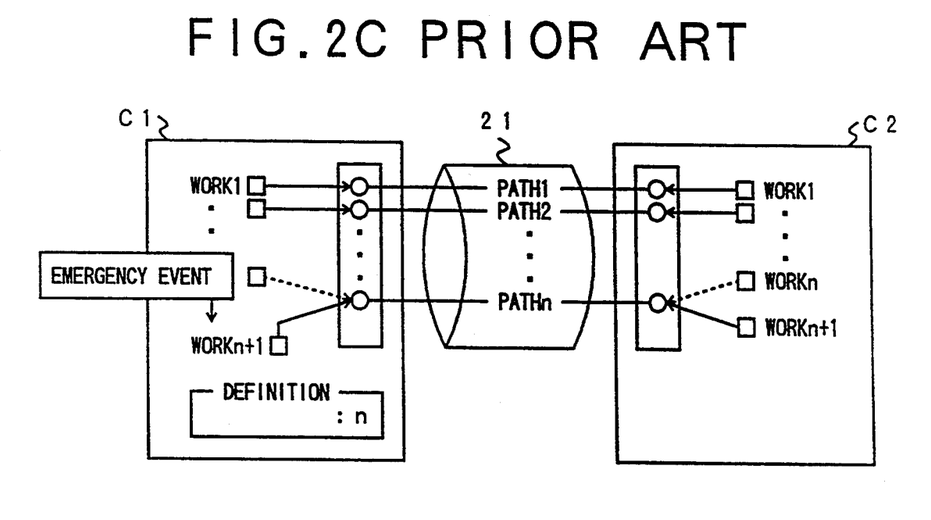

FIGS. 2A, 2B and 2C show a procedure for acquiring communication paths. Referring to FIG. 2A, the computer C1 executes words 1 through n, which use communication paths 1 through n, respectively. The computer C1 also executes words 1 through n, so that the works 1 through n are shared by the computers C1 and C2. The maximum number of communication paths available in the communication medium 21 is equal to n, while each of the computers C1 and C2 has executable works 1 through n+1.

Referring to FIG. 2B, an emergency event has occurred in the computer C1, which has a request to send an emergency message to the computer C2. However, the computer C1 cannot send such an emergency message to the computer C2 via the communication medium 21 because the works 1 through n use the communications paths 1 through n, respectively. In other words, all the communication paths 1 through n have been allotted to the works 1 through n, and it is impossible to allot a communication path to the emergency event.

Referring to FIG. 2C, the work n is completed and the communication path n is released. The work n+1 which requests to send the emergency message to the computer C2 acquires the communication path n. Then, the work n+1 sends the emergency message to the computer C2 via the communication path n, so that the work n+1 executed in the computer C2 is informed of the occurrence of the emergency event.

As described above, in the case where all the communication paths are busy, a new work cannot be executed irrespective of whether or not the above new work is emergency until one of the works is completed and one of the communication paths is released.

However, it is required to send an emergency message to the remote computer without delay of time if an emergency event has occurred. For the above requirement, it is desirable to allot a communication path to an emergency event immediately after an emergency event has occurred.

SUMMARY OF THE INVENTION

It is a general object of the present invention to provide a communication path acquiring method and a communication device in which the above disadvantages are eliminated.

A more specific object of the present invention is to provide a communication path acquiring method and a communication device capable of informing a remote computer of the occurrence of an emergency event.

The above objects of the present invention are achieved by a method for controlling communication paths multiplexed in a communication medium connecting first and second communication devices, each of which devices can simultaneously perform a plurality of works, the method comprising the steps of: (a) determining whether a communication request from one of the works is a normal communication request or an emergency communication request; (b) determining whether or not the number of communication paths which are now in use is less than a first predetermined number when it is determined that the communication request is a normal communication request; (c) allotting an idle communication path to the communication request when it is determined that the number of communication paths in use is less than the first predetermined number; (d) determining whether or not the number of communication paths which are now in use is less than a second predetermined number greater than the first predetermined number and equal to a maximum number of communication paths available in the communication medium; and (e) allotting an idle communication path to the communication request which is determined to be as an emergency communication request when it is determined that the number of communication paths in use is less than the second predetermined number.

The above objects of the present invention are also achieved by a communication device connected to a remote communication device via a communication medium having communication paths, the communication device simultaneously performing works, the communication device comprising: first means for determining whether a communication request from one of the works is a normal communication request or an emergency communication request; second means for determining whether or not the number of communication paths which are now in use is less than a first predetermined number when it is determined that the communication request is a normal communication request; third means for allotting an idle communication path to the communication request when it is determined that the number of communication paths in use is less than the first predetermined number; fourth means for determining whether or not the number of communication paths which are now in use is less than a second predetermined number greater than the first predetermined number and equal to a maximum number of communication paths available in the communication medium; and fifth means for allotting an idle communication path to the communication request which is determined to be as an emergency communication request when it is determined that the number of communication paths in use is less than the second predetermined number.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
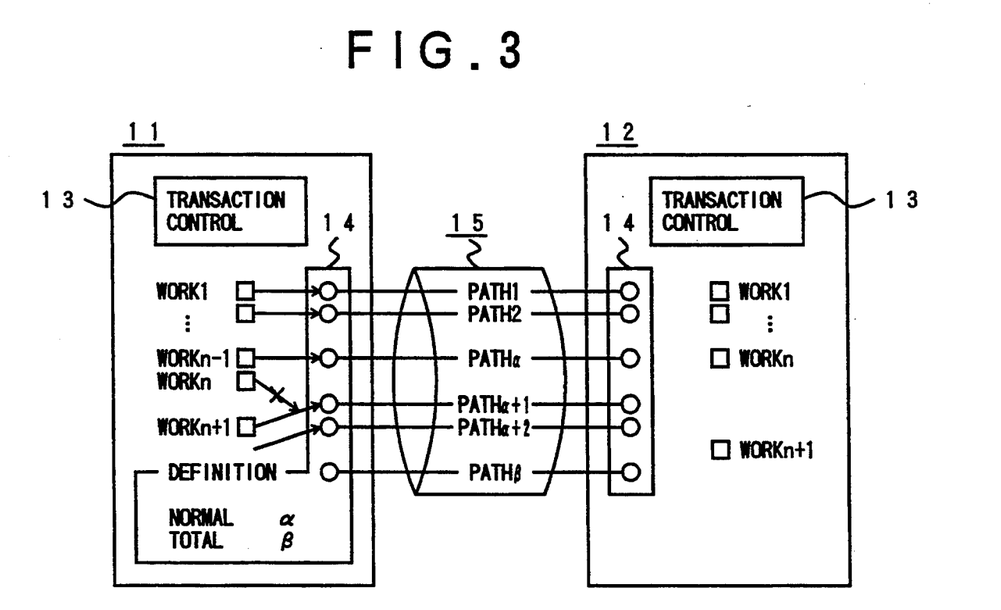
FIG. 3 is a block diagram of an embodiment of the present invention.

FIG. 3 is a block diagram of an embodiment of the present invention. A system shown in FIG. 3 comprises two computers 11 and 12, and a communication medium 15 connecting the computers 11 and 12 together. Each of the computers 11 and 12 includes a transaction controller 13 and an allocation table 14. In the communication medium 15, D multiplexed communication paths are available at most where D is an integer. Normally, $\alpha$ communication paths are available in the communication medium 15 where a is an integer and less than $\beta$. Works 1 through n+1 processed in the computers 11 and 12 execute respective processes while sending process normal communication requests and emergency communication requests to other works and co-operating with other works.

The allocation table 14 in the computer 11 manages information indicating whether or not the $\beta$ communication paths in the communication medium 15 are busy. When the transaction controller 13 in the computer 11 receives a normal communication request from a work, the transaction controller 13 refers to the allocation table 14 and determines whether or not the number of busy communication paths is less than the normally allotted number $\alpha$. When it is determined that the number of busy communication paths is less than the normally allotted number $\alpha$, the transaction controller 13 allots an idle communication path to the above normal communication request. When all the communication paths are busy, the transaction controller 13 sends the work being considered to information indicating that there is no idle communication path to be allotted thereto.

When the transaction controller 13 receives an emergency communication request from a work, the transaction controller 13 refers to the allocation table 14 and determines whether or not the number of busy communication paths is less than the total number $\beta$ of communication paths. When it is determined that the number of busy communication paths is less than the number $\beta$, the transaction controller 13 allots an idle communication path to the above emergency communication request.

As will be described in detail later, the format of communication requests generated by the works has information indicating whether the communication request is normal or emergency. The transaction controller 13 refers to the above information contained in the received communication request, and makes a decision as to whether or not the received communication request is normal or emergency.

Figure 5:
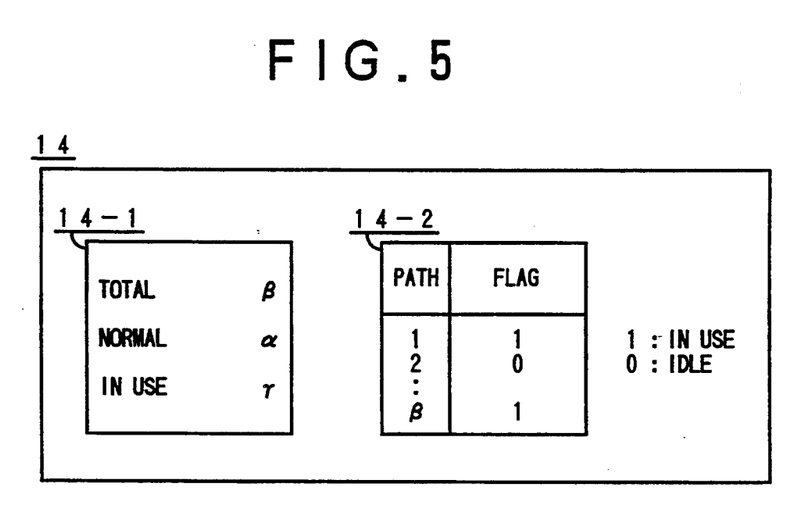
FIG. 5 is a diagram of an allocation table used in the embodiment of the present invention.

The allocation table 14 stores information indicating the total number D of communication paths and the number a of communication paths available in the normal operation. Further, the allocation table 14 stores information indicating the number $\tau$ of communication paths which are now in use. More particularly, the allocation table 14 includes a number-of-allocated-path table 14-1 and a path management table 14-2, as shown in FIG. 5. The table 14-1 stores information indicating the above numbers D, $\alpha$ and $\tau$. The path management table 14-1 stores flags respectively provided for the $\beta$ communication paths, the flags indicating whether or not the $\beta$ communication paths are idle. When the flag indicates "1", the corresponding communication path is in use. When the flag indicates "0", the corresponding communication path is idle.

A description will now be given, with reference to FIG. 4, of the operation of the embodiment of the present invention. Each of the computers 11 and 12 executes works 1 through n+1, which are programs.

The transaction controller 13 receives a communication request from, for example, the work 1 in step S1. As will be described later with reference to FIG. 6, the transaction controller 13 receives a communication request by a record issued by a work which requests to communicate with the remote computer. In step S2, the transaction controller 13 determines whether the received communication request is a normal or emergency request. The above-mentioned record includes information indicating whether the communication request is normal or emergency. The transaction controller 13 refers to the above information. When the transaction controller 13 determines that a normal communication request has been received, the transaction controller 13 determines, by referring to the allocation table 14 shown in FIG. 5 in step S3, whether or not the number r of communication paths now in use is less than the threshold number $\alpha$.

When it is determined that the number $\tau$ of communication paths now in use is less than the threshold number $\alpha$, the transaction controller 13 allows an idle communication path to the work 1 processed by the computer 11 and allows the work 1 to communicate with the work 2 processed by the computer 12. Then, the transaction controller 13 updates the allocation table 14, more particularly, the tables 14-1 and 14-2. When it is determined that the number r of communication paths now in use is equal to or greater than the threshold number a, the transaction controller 13 informs the work 1 generating the normal communication request being considered that the transaction controller 13 waits for release of a communication path from the busy state.

When it is determined, in step S2, that the communication request from the work 1 is an emergency request, the transaction controller 13 determines, by referring to the allocation table 14 shown in FIG. 5 in step S6, whether or not the number r of communication paths now in use is less than the total number $\beta$ of communication paths available in the communication medium 15. When the result of the step S6 determination is affirmative, the transaction controller 13 allots an idle communication path to the work 1, which is then allowed to communicate with the work 2 performed by the computer 12. Then, the transaction controller 13 updates the tables 14-1 and 14-2. When the result of the step S6 determination is negative, the transaction controller 13 informs the work 1 generating the emergency communication request being considered that the transaction controller 13 waits for release of a communication path from the busy state.

Figure 6:
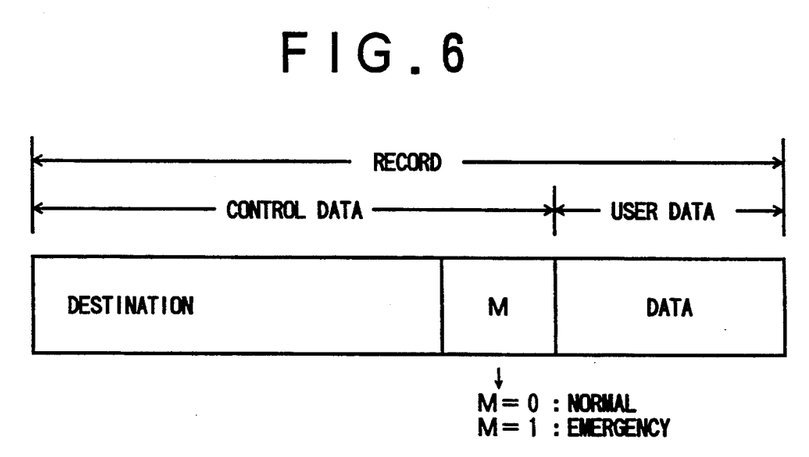
FIG. 6 is a diagram of a record used in the embodiment of the present invention.

FIG. 6 shows a record by which a work sends a communication request to the transaction controller 13. The record shown in FIG. 6 includes control data and user data. The control data includes a remote destination (work) and an allocation mode data M. When the allocation mode data M indicates 0, the transaction controller 13 determines, in step S2, that the received communication request is a normal request. When the allocation mode data M indicates 1, the transaction controller 13 determines, in step S2, that the received communication request is an emergency request.

Figure 7:
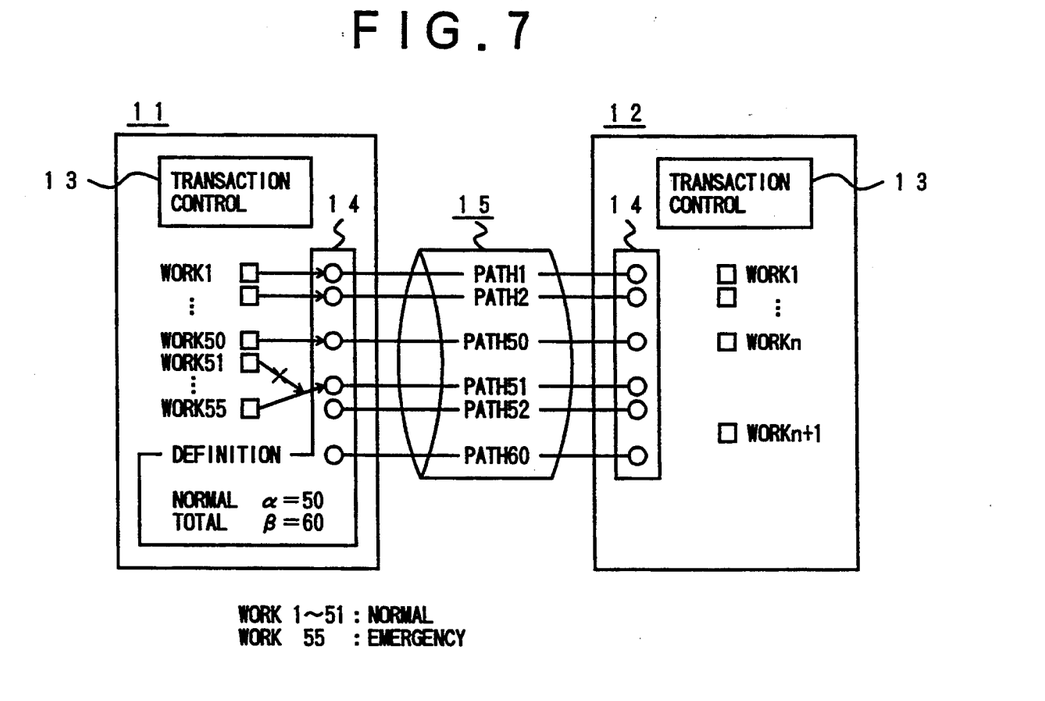
FIG. 7 is a block diagram of an example of the operation of the embodiment of the present invention.

FIG. 7 shows an example of the operation of the embodiment of the present invention. In the example shown in FIG. 7, $\alpha=50$ and D=60. The computer 11 is processing works 1 through 50 to which communication paths 1 through 50 are allotted. The works 1 through 50 processed by the computer 11 cooperate with the works 1 through 50 processed by the computer 12. In this case, there is no idle communication path in the normal operation. In other words, the result of the step S3 determination is negative.

In the state in which the 50 communication paths are all busy, 10 emergency communication requests can be accepted because $\beta=60$. In the example shown in FIG. 7 shows that a communication path 51 is allotted to work 55 which has generated an emergency communication request. If an emergency request is received in the state in which the 60 communication paths are all busy, the result of the step S6 determination is negative.

As described above, according to the present invention, a maximum of 50 communication paths can be allotted to communication requests in the normal operation, and a maximum of 60 communication paths can be allotted to communication requests at the time of the emergency. Hence, idle communication paths can be immediately allotted to emergency communication requests.

Figure 8:
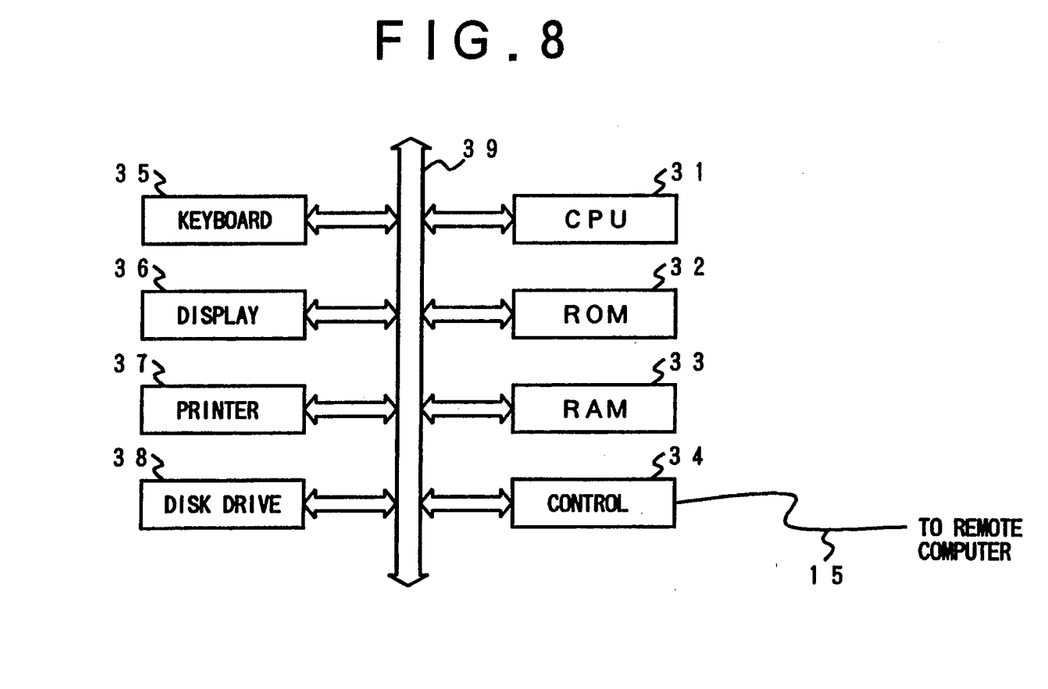
FIG. 8 is a block diagram of a hardware structure of each computer.

FIG. 8 is a block diagram of the hardware structure of each of the above-mentioned computers 11 and 12. Each of the computers 11 and 12 is made up of a CPU (Central Processing Unit) 31, a ROM (Read Only Memory) 32, a RAM (Random Access Memory) 33, a communication controller 34, a keyboard 35, a display 36, a printer 37, and disk drive 38. These structural elements are connected together via a bus 39. The CPU 31 controls the overall operation of the computer 11 or 12. More particularly, the CPU 31 executes various works and the process shown in FIG. 4 in accordance with a corresponding program stored in the ROM 32. The RAM 33 functions as a work memory of the CPU 31. The allocation table 14 including the tables 14-1 and 14-2 shown in FIG. 5 is formed in the RAM 33. The communication controller 34 controls the communication medium 15 under the control of the CPU 31. For example, the communication controller 34 establishes communication paths under the control of the CPU 31 in accordance with the method as has been described previously.

The keyboard 35 is used to input data and commands to the computer 35. The display 36 is used to display necessary information. The printer 37 is used to print out necessary information. The disk drive 38 includes a disk-shaped medium, such as an optical disk or a magnetic disk, and functions as an external device.

Figure 9:
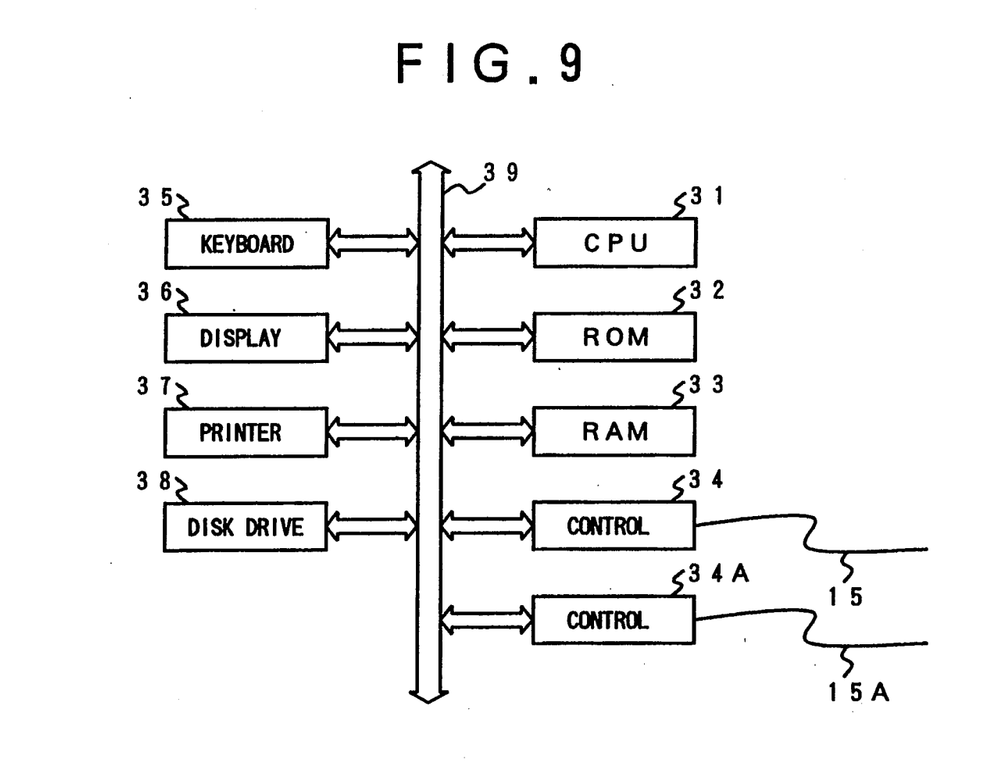
FIG. 9 is a block diagram of another hardware structure of each computer.

FIG. 9 is a block diagram of a variation of the hardware structure of the computer 11 shown in FIG. 8. In FIG. 9, parts that are the same as those shown in FIG. 8 are given the same reference numbers. The computer 11 shown in FIG. 9 has a communication controller 34A connected to another communication medium 15A in addition to the structural elements shown in FIG. 8. The computer 11 shown in FIG. 9 is connected to two remote computers (not shown in FIG. 9) via the communication mediums 15 and 15A. Two allocation tables are defined for the respective communication mediums 15 and 15A, and are formed in the RAM 33. More particularly, one number-of-allotted-path table 14-1 and one path management table 14-2 are defined with respect to the communication medium 15, and another number-of-allotted-path table 14-1 and one path management table 14-2 are defined with respect to the communication medium 15. The numbers $\alpha$, $\beta$ and $\tau$ can be separately defined with the communication mediums 15 and 15A. The transaction controller 13 shown in FIG. 3 realized by the CPU 31 is provided in common with the communication mediums 15 and 15A. Two separate transaction controllers can be provided for the communication mediums 15 and 15A.

In the aforementioned embodiment and variation, the transaction controller 13 which receives a communication message updates the allocation table 14 so that the corresponding flag defined in the table 142 is switched to "1". In this manner, the contents of the tables 14 of the two computers 11 and 12 are always made to be the same as each other.

Figure 4:
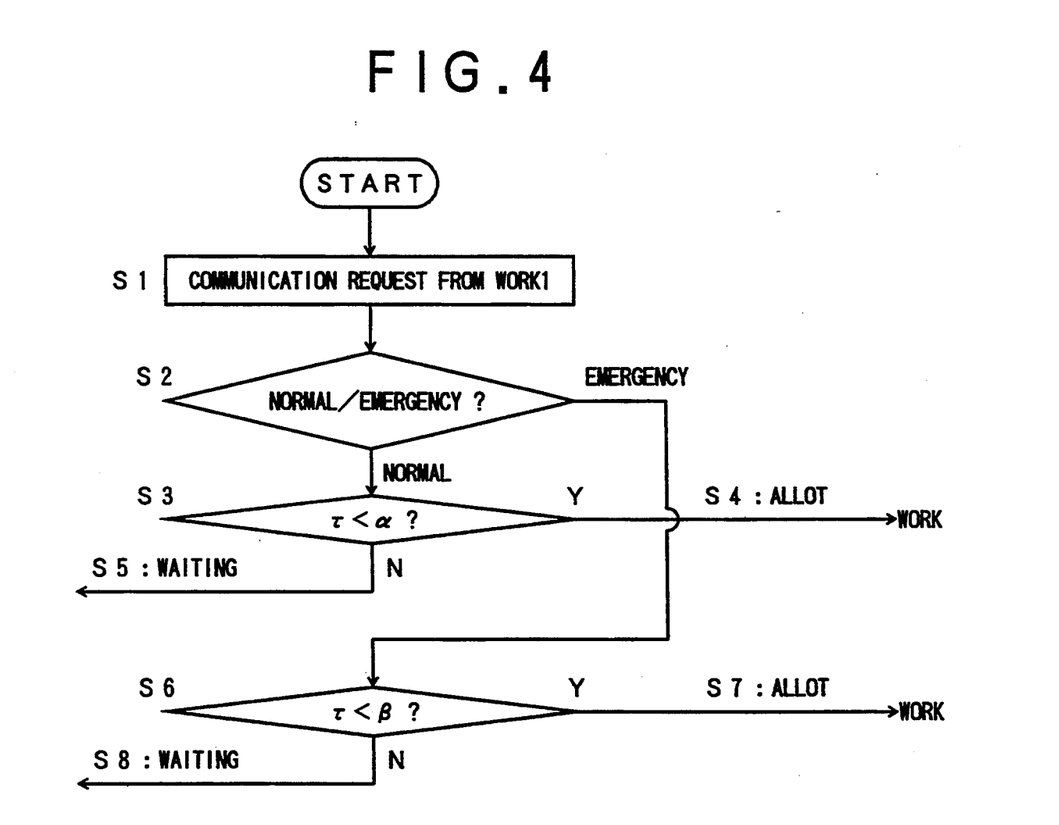
FIG. 4 is a flowchart of the operation of the embodiment of the present invention shown in FIG. 3.

Each of the computers 11 and 12 can perform the process shown in FIG. 4. Alternatively, it is possible for either the computer 11 or the computer 12 to perform the process shown in FIG. 4. In this case, one of the computers 11 and 12 functions as a master computer, and the other computer functions as a slave computer. In this case, the master computer manages the communication medium or mediums in response to receipt of communication requests. The allocation table 14 provided in the slave computer may be omitted.

The present invention is not limited to the specifically embodiments, and variations and modifications may be made without departing from the scope of the present invention.

What is claimed is:

1. A method for controlling a plurality of communication paths multiplexed in a communication medium connecting first and second communication devices, in which each of the communication paths is either in use or is idle, and each of which devices can simultaneously perform a plurality of works, said method comprising the steps of:
- (a) determining whether a communication request from one of the works is in a category of a normal communication request or in a category of an emergency communication request;
- (b) determining whether or not a number of communication paths which are currently in use is less than a first predetermined number when it is determined that said communication request is in a category of a normal communication request;
- (c) allotting a first idle one of the communication path to said communication request when it is determined that said number of communication paths in use is less than the first predetermined number, to cause a new number of communication paths to become in use;
- (d) determining whether or not said new number of communication paths is less than a second predetermined number greater than said first predetermined number said second predetermined number being equal to a total number of the communication paths in said communication medium; and
- (e) allotting a second idle one of said communication paths to a further communication request if said further communication request is determined to be in a category of an emergency communication request when it is determined that said new number of communication paths in use is less than said second predetermined number.

2. The method as claimed in claim 1, wherein the step (a) comprises the step of referring to predetermined information contained in a record generated by said one of the works, said predetermined information indicating whether the communication request is in a category of a normal communication request or an emergency communication request.

3. The method as claimed in claim 1, wherein the step (b) comprises the step of referring to a predetermined table storing information indicating said first predetermined number and information indicating whether each of the communication paths available in the communication medium is idle or busy.

4. The method as claimed in claim 1, wherein the step (d) comprises the step of referring to a predetermined table storing information indicating said second predetermined number and information indicating whether each of the communication paths available in the communication medium is idle or busy.

5. The method as claimed in claim 1, wherein:
- the step (b) comprises the step of referring to a predetermined table storing information indicating said first predetermined number and information indicating whether each of the communication paths available in the communication medium is idle or busy; and
- the step (d) comprises the step of referring to a predetermined table storing information indicating said second predetermined number and information indicating whether each of the communication paths available in the communication medium is idle or busy.

6. A communication device connected to a remote communication device via a communication medium having a plurality of communication paths, in which each of the communication paths is either in use or is idle, and said communication device simultaneously performing a plurality of works, said communication device comprising:
- first means for determining whether a communication request from one of the works is in a category of a normal communication request or in a category of an emergency communication request;
- second means for determining whether or not a number of communication paths which are currently in use is less than a first predetermined number when it is determined that said communication request is in a category of a normal communication request;
- third means for allotting a first idle one of the communication paths to said communication request when it is determined that said number of communication paths in use is less than the first predetermined number, to cause a new number of communication paths to become in use;
- fourth means for determining whether or not said new number of communication paths is less than a second predetermined number greater than said first predetermined number, said second predetermined number being equal to a total number of the communication paths in said communication medium; and
- first means for allotting a second idle one of said communication paths to a further communication request if said further communication request is determined to be in a category of an emergency communication request when it is determined that said new number of communication paths in use is less than said second predetermined number.

7. The communication device as claimed in claim 1, wherein said first means comprises means for referring to predetermined information contained in a record generated by said one of the works, said predetermined information indicating whether the communication request is in a category of a normal communication request or an emergency communication request.

8. The communication device as claimed in claim 1, wherein said second means comprises means for referring to a predetermined table storing information indicating said first predetermined number and information indicating whether each of the communication paths available in the communication medium is idle or busy.

9. The communication device as claimed in claim 1, wherein said fourth means comprises means for referring to a predetermined table storing information indicating said second predetermined number and information indicating whether each of the communication paths available in the communication medium is idle or busy.

10. The communication device as claimed in claim 1, wherein:
- said second means comprises means for referring to a predetermined table storing information indicating said first predetermined number and information indicating whether each of the communication paths available in the communication medium is idle or busy; and
- said fourth means comprises means for referring to a predetermined table storing information indicating said second predetermined number and information indicating whether each of the communication paths available in the communication medium is idle or busy.

* * * * *